Patented Sept. 25, 1923.

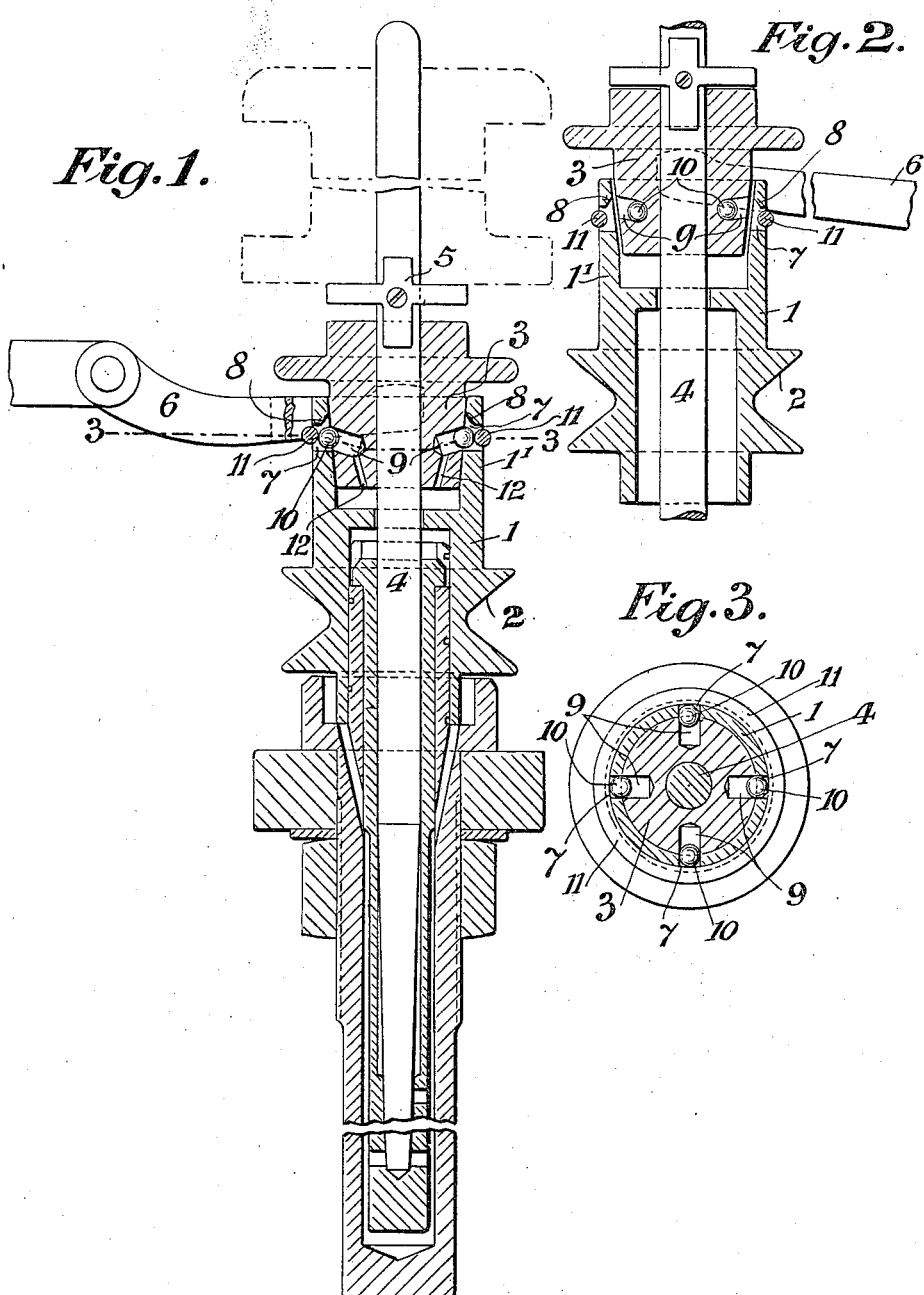

1,468,978

UNITED STATES PATENT OFFICE.

HANS SCHWEITER, OF HORGEN, SWITZERLAND.

DEVICE FOR COUPLING SPOOLS AND SPINDLES IN WINDING MACHINERY.

Application filed March 29, 1922. Serial No. 547,838.

*To all whom it may concern:*

Be it known that I, HANS SCHWEITER, a Swiss citizen, residing at Horgen, in the Canton of Zurich, Switzerland, have invented a new and useful Improvement in Devices for Coupling Spools and Spindles in Winding Machinery, of which the following is a specification.

This invention relates to devices for coupling spools and spindles in winding machinery or the like.

Hitherto the coupling between spools and spindles in winding machinery or the like was effected by springs applied to the spindles which had the defect of an undesired axial displacement and the twisting of the spool in relation to the spindle which could not be prevented. This result caused faults in winding or spooling.

The main object of my invention is to provide a device wherein said defect is overcome.

I attain this object by the mechanism illustrated in the accompanying drawing, in which—

Figure 1 is a detached view in longitudinal section illustrating the first.

Figure 2 is a view in longitudinal section illustrating the second embodiment.

Figure 3 is a detached plan view of a detail.

Referring to Figure 1 of the drawing, the end of the wharve 1 has secured to it by means of a flange ring 2, two metal sleeves 3 and 4 which form a hollow space 5. In this space is located an inwardly expanding spring ring 6 (Figure 3) and three balls 7 which are pressed by the spring ring 6 into the openings formed in the metal sleeve 3 and serve as carriers.

On the end of the spool 8 is secured concentrically a casing 9 surrounding the spindle and having externally an annular groove 10 in which are a number of recesses 11 corresponding in number with the balls 7. The spindle 12 has a cylindrical boss 13, Figure 2, which guides the spool concentrically.

When the spool is slid on the spindle, the balls 7 will be pressed back a little, then snap into the groove 10 and after a slight turn of the spool 8 into the recesses 11 whereby axial movement and turning of said spool will be prevented and it will be held fast and rigidly coupled.

In the example shown in Figure 2, the spool 8 has at one end a recess and a tube 9' which has a circumferential groove and three recesses for the reception of a part of each of the balls 7.

The balls 7 and the outwardly acting spring 6 are arranged in the hollow space formed by a recess in the wharve 1' and a cap 4' to the wharve and having holes for the balls 7 to partially project through.

When the spool is slid on the spindle, the balls 7 are first pressed inwards and then enter the groove whereupon after slightly turning the spool the balls snap into the recesses of sleeve 9' and couple the spool with the spindle.

To uncouple the spool it is best to turn the spool a little and then withdraw it from the wharve.

The balls may also be located in radial holes and employed under the influence of coiled springs which tend to force them outwards.

I claim:—

1. In a device for coupling the spindles and spools of winding machinery and the like spring influenced balls movably mounted in one of the two parts to be coupled; and means on the other of said parts adapted to receive and be engaged by portions of said balls.

2. In a device for coupling the spindles and spools of winding machinery and the like; balls movably mounted on the one of the two parts to be coupled; spring means acting on said balls to press them inwards; and means on the other part for engagement by said balls.

3. In a device for coupling the spindles and spools of winding machines and the like; balls movably mounted on the one of the two parts to be coupled; means on the other of the two parts for engagement by the said balls; and spring means on the first named part acting on the said balls to press them into yielding engagement with the means on the second named part.

4. In a device for coupling the spindles and spools of winding machinery and the like, yielding carrier members mounted radially movable on one of the parts to be coupled; a recess at one end of the spool; a metal cap on said recess; an annular groove in said cap to receive the carrier members; and recesses in said groove to form engagement by said carrier members.

5. In a device for coupling spools and spindles in winding machinery and the like; a member rigid with the spindle; yielding carrier balls provided on the said member; engaging means provided on the spool for engagement by said carrier balls; and a cylindrical shoulder on the spindle adapted to guide the spool concentrically.

6. In a device for coupling spools and spindles in winding machinery and the like, carrier balls mounted on one of the parts to be coupled; spring means acting on said balls to force them into coupling position; a wharve on the spindle; an annular shell fixed on the wharve; and holes in said shell for the carrier balls to partly project through.

Signed at Zurich, in the Canton of Zurich, Switzerland, this 10th day of March, 1922.

HANS SCHWEITER.

Witnesses:
FARN E. VALLENWEIDER,
OSCAR RUEGG.

Certificate of Correction.

It is hereby certified that in Letters Patent No. 1,468,978, granted September 25, 1923, upon the application of Hans Schweiter, of Horgen, Switzerland, for an improvement in "Devices for Coupling Spools and Spindles in Winding Machinery," an error appears requiring correction as follows: The present drawing should be canceled and the drawing containing three figures as shown below should be inserted therefor as part of the Letters Patent:

Sept. 25, 1923.      H. SCHWEITER      1,468,978

DEVICE FOR COUPLING SPOOLS AND SPINDLES IN WINDING MACHINERY

Filed March 29, 1922

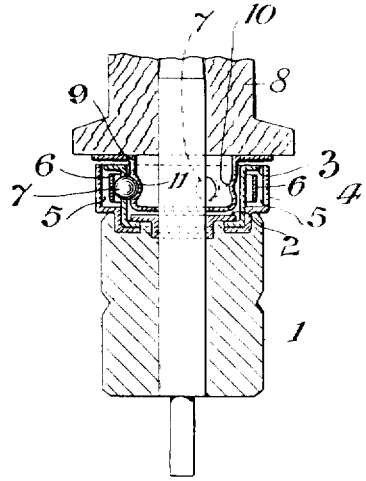

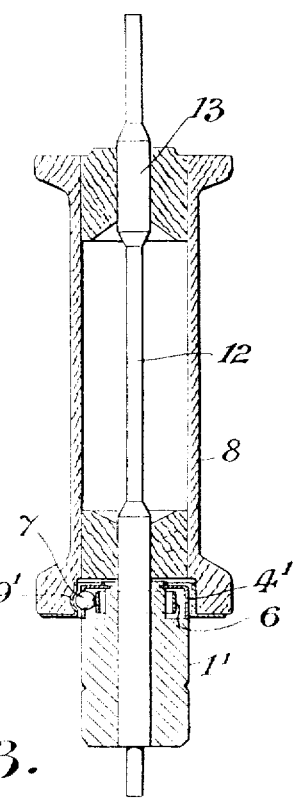

Inventor.
Hans Schweiter
Per Ferdinand Broster Bonhardt
Attorney.

and that the said Letters Patent should be read with this correction therein that the same may conform to the record of the case in the Patent Office.

Signed and sealed this 4th day of March, A. D. 1924.

[SEAL.]      KARL FENNING,
*Acting Commissioner of Patents.*